United States Patent [19]

Young et al.

[11] 4,323,827

[45] Apr. 6, 1982

[54] APPARATUS FOR CONTROLLING A TWO-SPEED SHIFT MOTOR

[75] Inventors: Richard N. Young; James A. Williams, both of Richmond, Ind.

[73] Assignee: Dana Corporation, Toledo, Ohio

[21] Appl. No.: 175,838

[22] Filed: Aug. 6, 1980

[51] Int. Cl.³ .............................................. H02K 7/14
[52] U.S. Cl. ........................................ 318/3; 318/12; 318/15; 318/446; 318/447; 318/452
[58] Field of Search ...................... 318/3, 12, 15, 446, 318/447, 452; 74/866, 752 D

[56] References Cited

U.S. PATENT DOCUMENTS 2,611,886  9/1952  Kamper .................................. 318/15

Primary Examiner—J. V. Truhe
Assistant Examiner—Eugene S. Indyk
Attorney, Agent, or Firm—Wilson, Fraser, Barker & Clemens

[57] ABSTRACT

An electronic control means utilized in an electrically actuated shift apparatus for a multispeed axle including an electric power source and an electric motor coupled to actuate means for shifting the axle. The power source is connected to the electric motor through a shift speed control switch and a plurality of steering diodes. When the switch is actuated to select an axle speed, power is applied through one of the steering diodes to one side of the armature of the motor. Power is also applied through another of the diodes as a shift signal to a timing circuit. A first means is responsive to the shift signal for generating a first control signal for a first predetermined time. At the termination of the first control signal, the timing circuit generates a second control signal to connect the other side of the motor armature to ground thereby actuating the motor. The timing circuit generates the second control signal for a second predetermined time which is greater than the time required to shift the axle and less than the potential burnout time of the motor. At the end of the second predetermined time, the second control signal is terminated and the motor is disconnected from ground potential to discontinue current flow through the motor armature.

13 Claims, 2 Drawing Figures

APPARATUS FOR CONTROLLING A TWO-SPEED SHIFT MOTOR

BACKGROUND OF THE INVENTION

1. Field of the Invention

The present invention relates in general to an apparatus for shifting a two-speed axle for a vehicle and in particular to a control apparatus for an electric motor actuated shifting apparatus.

2. Description of the Prior Art

In truck-type vehicles where heavy loads are being hauled, it is advantageous to have available a plurality of gear ratios between the engine and the drive wheels for quickly and efficiently bringing the vehicle up to speed and maintaining a desired engine speed at various road speeds. One method of obtaining a relatively large number of gear ratios is to utilize a multi-speed transmission with a multi-speed drive axle. For example, a four-speed transmission and a two-speed axle combination provides eight gear ratios.

In prior art two-speed axle controls, an electric motor is utilized to actuate the shifting mechanism. The motor is bi-directional and, therefore, is actuated in one direction to shift into low speed and is actuated in the other direction to shift into high speed. The motor control circuit utilizes limit switches to sense when the motor reaches the fully shifted position and breaks the power circuit to the motor. Such switches are subject to power surges and arcing. If the switch fails in the closed mode, the motor will continue to operate until the switch is broken or the motor burns up.

SUMMARY OF THE INVENTION

The present invention relates to a control means for operating an electric motor to actuate a shift mechanism for multi-speed vehicle axle. The control circuit is described in terms of shifting between a low speed and a high speed upon the actuation of a manually actuated shift lever. The shift lever actuates a switch connected in series with a plurality of sheering diodes between a power source and the armature of the shift motor. Each of the high speed and low speed contacts of the switch is connected to three associated steering diodes. The first diode is connected to one side of the armature of the shift motor. The second diode is connected to an input to a timing circuit, and the third diode is connected to a coil of a relay. When the switch is actuated from one speed to the other speed, a shift signal is generated through the second diode to the timing circuit to charge a capacitor to a regulated voltage. The timing circuit is responsive to the shift signal to generate a first control signal for first predetermined time. When the first control signal is terminated, the timing circuit responds by generating a second control signal for a second predetermined time. The timing circuit is responsive to the second control signal for connecting the relay coil to ground to allow current to flow through the third steering diode and the coil. The relay closes its switch contacts to connect the other side of the motor armature to ground and allow current to flow through the first diode and the motor armature. Thus, the motor is actuated for the second predetermined time. When the second control signal is terminated, the relay coil is disconnected from the ground potential, the relay contacts open, and the motor armature is disconnected from ground potential to terminate the flow of current through the motor armature.

It is an object of the present invention to provide a multi-speed axle shift control means having increased protection against motor burnout.

It is a further object of the present invention to provide a multi-speed axle shift control means having increased reliability.

DESCRIPTION OF THE PREFERRED EMBODIMENT

The present invention concerns a control circuit for an electric motor actuated multi-speed axle shift control mechanism. For the purpose of ease of description, the control circuit will be shown in connection with a two-speed axle having a high speed and a low speed position. The shift mechanism attached to the output shaft of the electric motor and the axle are conventional and, therefore, are not shown in detail.

Figure 1:
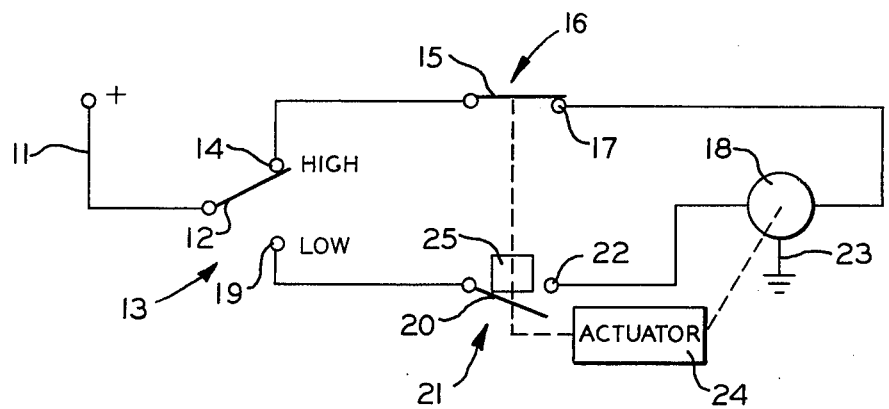
FIG. 1 is a schematic diagram of a prior art control circuit for an electric motor actuated two-speed axle shift apparatus.

There is shown in FIG. 1 a schematic diagram of the electric control circuit for a prior art electric motor actuated shift mechanism for a two-speed axle. A positive potential terminal of a vehicle power supply (not shown) is connected to an input line 11 of the circuit. The input line 11 is connected to a moveable contact 12 of a single pole, double throw switch 13. A fixed contact 14 of the switch 13 is connected to a moveable contact 15 of a single pole, single throw switch 16. A fixed contact 17 of the switch 16 is connected to an armature winding of a bi-directional, direct current electric motor 18.

A second fixed contact 19 of the switch 13 is connected to a moveable contact 20 of a single pole, single throw switch 21. A fixed contact 22 of the switch 21 is connected to the armature winding of the motor 18. The armature winding is also connected to a negative or ground potential terminal of the vehicle power supply by a return line 23. The armature winding is connected in such a manner that the motor will rotate in one direction when power is applied through the switch 16 and will rotate in the opposite direction when power is applied through the switch 21.

The switch 13 typically is located near the driver of the vehicle. When the driver moves the moveable contact 12 to the fixed contact 14, he selects the high speed of the axle and power is applied to the motor armature through the switches 13 and 16. The motor is mechanically coupled to a ball screw actuator 24 and drives the actuator to shift the axle to high speed. A nut 25 is driven by the ball screw from the position shown toward the switch 16. At the end of travel of the nut, the nut opens the switch 16 which removes the power from the armature and the motor stops.

As the nut travels away from the switch 21, the moveable contact 20 moves to the fixed contact 22 and the switch 21 is closed. If the driver decides to switch to low speed, he moves the moveable contact 12 to the fixed contact 19 and power is applied to the motor armature through the switches 13 and 21. The motor rotates in the opposite direction and the nut is moved to open the switch 16 and close the switch 21. Thus, the switches 16 and 21 function as limit switches to turn off the motor by opening the armature current path.

If one of the switches 16 and 21 fails in the closed mode, the shift control typically is damaged in one of two ways. Either the failed switch is mechanically broken as the motor attempts to drive past the limit, or the motor burns out from continuous operation.

Figure 2:
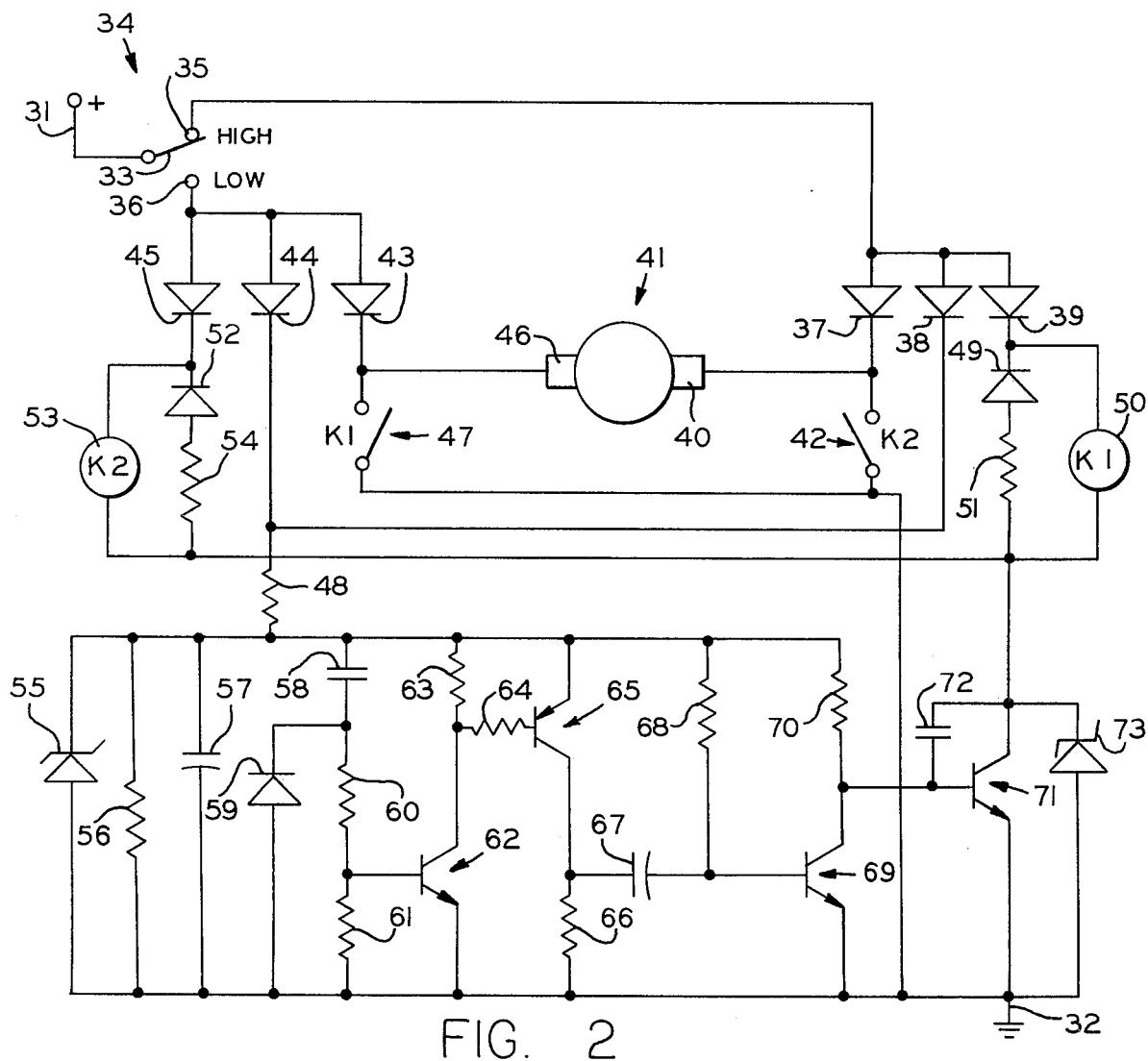
FIG. 2 is a schematic diagram of a shift control circuit according to the present invention.

A schematic diagram of the electrical circuit for the present invention is shown in FIG. 2. A positive potential direct current power supply (not shown) is connected between an input line 31 and a ground potential return line 32. The input line 31 is connected to a movable contact 33 of a single pole, double throw switch 34. The switch 34 includes a fixed contact 35 for selecting the high speed position of the axle and a fixed contact 36 for selecting the low speed position of the axle.

The fixed contact 35 is connected to the anode of three diodes 37, 38 and 39. The diode 37 has a cathode connected to one side 40 of an armature winding of a bi-directional, direct current electric motor 41. The cathode of the diode 37 is also connected to one side of K2 relay contacts 42. The low speed fixed contact 36 is connected to the anodes of three diodes 43, 44 and 45. The diode 43 has a cathode connected to the other side 46 of the armature of the motor 41. The cathode of the diode 43 is also connected to one side of K1 relay contacts 47. The other sides of the relay contacts 42 and 47 are connected together and to the return line 32.

A cathode of the diode 38 is connected to a cathode of the diode 44 and both cathodes are connected to one side of a resistor 48. A cathode of the diode 39 is connected to a cathode of a diode 49 and one side of a coil of a K1 relay coil 50. An anode of the diode 49 is connected through a resistor 51 to the other side of the K1 relay coil 50. A cathode of the diode 45 is connected to a cathode of a diode 52 and one side of a K2 relay coil 53. An anode of the diode 52 is connected through a resistor 54 to the other side of the K2 relay coil 53. The junction of the other side of the relay coil 50 and the resistor 51 is connected to the junction of the other side of the relay coil 53 and the resistor 54.

The other side of the resistor 48 is connected to a cathode of a zener diode 55. An anode of the zener diode 55 is connected to the return line 32. A resistor 56 and a capacitor 57 are connected in parallel across the zener diode 55.

The other side of the resistor 48 is also connected to one side of a capacitor 58. The other side of the capacitor 58 is connected to a cathode of a diode 59 and one side of a resistor 60. An anode of the diode 59 is connected to the return line 32. The other side of the resistor 60 is connected through a resistor 61 to the return line 32 and to a base of an NPN transistor 62. The other side of the resistor 48 is connected through a resistor 63 to a collector of the transistor 62. The transistor 62 also has an emitter connected to the return line 32.

The collector of the transistor 62 is connected through a resistor 64 to a base of a PNP transistor 65. The transistor 65 has an emitter connected to the other side of the resistor 48 and a collector connected through a resistor 66 to the return line 32. The collector of the transistor 65 is connected to one side of a capacitor 67. The other side of the capacitor 67 is connected through a resistor 68 to the other side of the resistor 48 and to a base of an NPN transistor 69. The transistor 69 has a collector connected through the resistor 70 to the other side of the resistor 48 and an emitter connected to the return line 32.

The collector of the transistor 69 is also connected to a base of an NPN transistor 71. The transistor 71 has an emitter connected to the return line 32 and a collector connected to the junction of the K1 relay coil 50, the resistor 51, the relay K2 coil 53, and the resistor 54. A capacitor 72 is connected between the collector and the base of the transistor 71. A diode 73 has an anode connected to the return line 32 and a cathode connected to the collector of the transistor 71.

The switch 34 is mounted in proximity to the driver of the vehicle for selecting the desired axle speed. When the switch 34 is in the "high" speed position, current flows through the armature of the motor 41 in a direction which will cause the motor to actuate a shift mechanism to shift the axle into the "high" speed position. When the switch 34 is in the "low" speed position, current will flow through the armature of the motor 41 in the opposite direction to cause the motor to actuate the shift control mechanism to shift the axle into the "low" speed position. The diodes 38, 39, 44, and 45 are steering diodes which permit the switch 34 to be actuated without affecting the portion of the circuit associated with the fixed contact from which the movable contact is being moved. When the movable contact reaches the fixed contact to which it is being moved, the associated circuitry applies power to the motor for a predetermined time which is greater than the minimum time required to shift the axle and is less than the potential burnout time of the motor 41.

If we assume that the switch 34 has been in the "high" speed position shown in FIG. 2 long enough for the "high" speed circuitry to time out, there will be no current flowing through the K1 relay coil 50 or the K2 relay coil 53. Thus, the relay contacts 42 and 47 will be in the open positions as shown. When the movable contact 33 is moved to the fixed contact 36, power is applied to the anodes of the diodes 43, 44, and 45. The diode 44 steers current through the resistor 48 to the timing circuitry which is connected to the other side of the resistor 48. The diode 44 steers current to the K2 relay coil 53 and its despiking network including the diode 52 and the resistor 54. The power applied to the armature of the motor 41 through the diode 43 is blocked by the diode 37. The zener diode 55, the resistor 56, and the capacitor 57 form a regulating circuit for regulating the voltage at the junction with the resistor 48. The capacitor 57 will charge towards this regulated voltage and will be held at the regulated voltage by the zener diode 55. The capacitor 58 and the resistor 60 form a differentiating network to generate a voltage spike to the base of the transistor 62. The voltage spike turns on the transistor 62 for approximately five milliseconds. The resistor 61 provides a high temperature current leakage path for the collector to base leakage current of the transistor 62. The diode 59 provides a path for rapidly discharging the capacitor 58 whenever the switch 34 is moved. This insures a positive reset action each time the switch 34 is actuated.

During the time that the transistor 62 is turned on, the transistor 65 is also turned on. The transistor 65 rapidly charges the capacitor 67 through the base-emitter junction of the transistor 69. The transistor 69 is maintained in a turned on condition through the resistor 68 and the charging of the capacitor 67. When the transistor 65 is turned off, the capacitor 67 is disconnected from the positive potential regulated voltage and returned to ground potential through the resistor 66. Since the voltage across a capacitor cannot change instantaneously, the voltage at the base of the transistor 69 drops below the ground potential to turn off the transistor 69. The transistor 71 is then turned on through the resistor 70 to connect the return line 32 to the other side of the K2 relay coil 53. The current flow through the coil 53 causes the K2 relay contacts 42 to close and connects the side 40 of the armature winding of the motor 41 to the return line 32. Current flows through the armature winding of the motor 41 which actuates the shift mechanism to shift the axle to the low speed position. The transistor 69 remains turned off until the capacitor 67 is recharged through the resistor 68 to a voltage which turns on the transistor 69. The base of the transistor 71 is then connected to the ground potential to turn off the transistor 71 and stop current flow through the K2 relay coil 53. The relay contacts 42 are opened to disconnect the motor 41 from the return line 32 and stop current flow through the armature of the motor 41. The zener diode 73 prevents the collector of the transistor 71 from "kicking" below the ground potential by more than approximately 0.6 volts and limits the maximum positive voltage to approximately 22 volts to protect the transistor 71 from a large reverse potential and positive voltage transients.

When it is desired to shift from the low speed to the high speed on the axle, the switch 34 is actuated and power is applied to the anodes of the diodes 37, 38 and 39. The diode 43 blocks current flow through the diode 37 and the armature winding of the motor 41. The diode 38 applies potential through the resistor 48 to the timing circuit. The diode 39 applies potential to the K1 relay coil 50. The timing circuitry functions in the same manner as described above for the "low" speed position of the switch 34. When the transistor 71 is turned on, current will flow through the K1 relay coil 50 to close the K1 relay contacts 47 and allow current flow through the armature winding of the motor 41 in a direction opposite to the current flow when the switch 34 was in the "low" speed position. When the timing circuitry times out, the transistor 71 is turned off, current stops flowing through the K1 relay coil 50, and the K1 relay contacts 47 are opened to stop current flow through the armature winding of the motor 41. As stated above, the timing circuit permits current flow through the armature winding of the motor 41 for a time which is greater than the time required to actuate the shift mechanism for the axle and is less than the potential burnout time of the motor 41.

In summary, the present invention relates to an electrically actuated shift apparatus for a multispeed axle including an electric power source and an electric motor coupled to actuate means for shifting the axle. A control means includes means for generating a shift signal, means responsive to the shift signal for generating a first control signal for a first predetermined time, means responsive to the termination of the first control signal for generating a second control for second predetermined time, and means responsive to the second control signal for connecting the power source to the motor for said second predetermined to shift the axle from one speed to another speed.

In accordance with the provisions of the patent statutes, the principle and mode of operation of the invention have been described and illustrated in its preferred embodiment. However, it must be understood that the invention can be practiced otherwise than as specifically illustrated and described without departing from its spirit or scope.

What is claimed is:
1. In an electrically actuated shift apparatus for a multi-speed axle including an electric power source and an electric motor coupled to actuate means for shifting the axle, a control means comprising:
   means for generating a shift signal;
   means responsive to said shift signal for generating a first control signal for a first predetermined time;
   means responsive to termination of said first control signal for generating a second control signal for a second predetermined time; and
   means responsive to said second control signal for connecting the power source to the motor for said second predetermined time to shift the axle from one speed to another speed.

2. The control means according to claim 1 wherein said means ror generating a shift signal includes a first switch means actuatable to a first position to connect the power source to one side of the electric motor and to a second switch means, and wherein said means responsive to said second control signal includes said second switch means and means responsive to said second control signal for actuating said second switch means to connect the power source to another side of the motor for said second predetermined time to shift the axle from said one speed to said another speed.

3. The control means according to claim 2 wherein said second switch means includes a relay coil connected between said first switch means and said means for actuating said second switch means and normally open relay contacts connected between said another side of the motor and the power source, and wherein said means for actuating said second switch means is responsive to said second control signal for energizing said relay coil to close said relay contacts.

4. The control means according to claim 2 wherein said first switch means is actuatable to a second position to connect the power source to said another side of the motor and to a third switch means, and wherein said means responsive to said second control signal includes said third switch means and means responsive to said second control signal for actuating said third switch means to connect the power source to said one side of the motor for said second predetermined time to shift the axle from said another speed to said one speed.

5. The control means according to claim 4 wherein said third switch means includes a relay coil connected between said first switch means and said means for actuating said third switch means and normally open relay contacts connected between said one side of the motor and the power source, and wherein said means for actuating said third switch means is responsive to said second control signal for energizing said relay coil to close said relay contacts.

6. The control means according to claim 4 wherein said first switch means is a manually actuatable switch for connecting the power source to one side of an armature of the motor in said first position and to another side of said armature in said second position.

7. In an electrically actuated shift apparatus for a two-speed axle including an electric power source and an electric motor coupled to actuate means for shifting the axle, a control means comprising:
   means for generating first and second shift signals;
   means responsive to said shift signals for generating a first control signal for a first predetermined time;

means responsive to the termination of said first control signal for generating a second control signal for a second predetermined time; and means responsive to said first shift signal and said second control signal for connecting the power source to the motor for said second predetermined time to shift the axle from a first speed to a second speed and responsive to said second shift signal and said second control signal for connecting the power source to the motor for said second predetermined time to shift the axle from said second speed to said first speed.

8. The control means according to claim 7 wherein said means for generating first and second shift signals includes manually actuatable first switch means actuatable to a first position to generate said first shift signal, to connect the power source to one side of the motor, and to connect a second switch means to the power source; and wherein said means responsive to said second control signal includes said second switch means and means responsive to said second control signal for actuating said second switch means to connect the power source to another side of the motor for said second predetermined time to shift the axle from said first speed to said second speed.

9. The control means according to claim 8 wherein said second switch means includes a relay coil connected between said first switch means and said means for actuating said second switch means and normally open relay contacts connected between said another side of the motor and the power source, and wherein said means for actuating said second switch means is responsive to said second control signal for energizing said relay coil to close said relay contacts.

10. The control means according to claim 9 including a first diode connected between said first switch means and said one side of the motor, a second diode connected between said first switch means and said means for generating said first control signal, and a third diode connected between said first switch means and said relay coil.

11. The control means according to claim 8 wherein said first switch means is actuatable to a second position to generate said second shift signal, to connect the power source to said another side of the motor, and to connect a third switch means to the power source; and wherein said means responsive to said second control signal includes said third switch means and means responsive to said second control signal for actuating said third switch means to connect the power source to said one side of the motor for said second predetermined time to shift the axle from said second speed to said first speed.

12. The control means according to claim 11 wherein said third switch means includes a relay coil connected between said first switch means and said means for actuating said third switch means and normally open relay contacts connected between said one side of the motor and the power source, and wherein said means for actuating said third switch means is responsive to said second control signal for energizing said relay coil to close said relay contacts.

13. The control means according to claim 12 including a first diode connected between said first switch means and another side of the motor, a second diode connected between said first switch means and said means for generating said first control signal, and a third diode connected between said first switch means and said relay coil.

* * * * *

UNITED STATES PATENT AND TRADEMARK OFFICE
CERTIFICATE OF CORRECTION

PATENT NO. : 4,323,827
DATED : April 6, 1982
INVENTOR(S) : Richard N. Young and James A. Williams It is certified that error appears in the above-identified patent and that said Letters Patent are hereby corrected as shown below:

Cover page, item [54] insert "AXLE" after "TWO-SPEED".
Column 1, line 3, add "AXLE" at the beginning of the line.
Claim 2, line 2, change "ror" to "for".

Signed and Sealed this

Fourteenth Day of September 1982

[SEAL]

Attest:

GERALD J. MOSSINGHOFF

Attesting Officer   Commissioner of Patents and Trademarks